US009045598B2

United States Patent
El-Toufaili et al.

(10) Patent No.: US 9,045,598 B2
(45) Date of Patent: Jun. 2, 2015

(54) PROCESS FOR PRODUCING AROMATIC POLYETHER SULFONES

(71) Applicant: BASF SE, Ludwigshafen (DE)

(72) Inventors: Faissal-Ali El-Toufaili, Ludwigshafen (DE); Achim Stammer, Freinsheim (DE); Simon Gramlich, Hirschberg (DE); Angela Ulzhöfer, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/016,504

(22) Filed: Sep. 3, 2013

(65) Prior Publication Data

US 2015/0065677 A1    Mar. 5, 2015

Related U.S. Application Data

(60) Provisional application No. 61/696,230, filed on Sep. 30, 2012.

(51) Int. Cl.
*C08G 8/02* (2006.01)
*C08G 75/23* (2006.01)

(52) U.S. Cl.
CPC .................................... *C08G 75/23* (2013.01)

(58) Field of Classification Search
USPC ......... 528/125, 126, 128, 173, 176, 179, 182, 528/193, 194; 525/471
See application file for complete search history.

(56) References Cited

U.S. PATENT DOCUMENTS

| 4,156,068 | A | 5/1979 | Hartmann |
| 4,200,727 | A | 4/1980 | Blinne et al. |
| 5,407,266 | A | 4/1995 | Dotsch et al. |
| 2003/0139494 | A1 | 7/2003 | Weber et al. |
| 2003/0139543 | A1* | 7/2003 | Wilhelm et al. ............... 526/65 |
| 2011/0105716 | A1* | 5/2011 | Stuetzle et al. ............... 528/354 |
| 2012/0083541 | A1 | 4/2012 | Khvorost et al. |

FOREIGN PATENT DOCUMENTS

| DE | 2749645 A1 | 5/1979 |
| DE | 4118884 A1 | 12/1992 |
| DE | 19940521 A1 | 4/2001 |
| DE | 10244628 A1 | 4/2003 |
| JP | 2004263154 A | 9/2004 |
| WO | WO-00/18824 A1 | 4/2000 |
| WO | WO-01/83618 A1 | 11/2001 |
| WO | WO-2010/146052 A1 | 12/2010 |

OTHER PUBLICATIONS

International Preliminary Report on Patentability issued in PCT/EP2013/068187, dated Feb. 18, 2014, no English translation.
International Preliminary Report on Patentability issued in PCT/EP2013/068187, dated Mar. 3, 2015, English Translation.

* cited by examiner

*Primary Examiner* — Shane Fang
(74) *Attorney, Agent, or Firm* — Drinker Biddle & Reath LLP

(57) ABSTRACT

The process for producing aromatic polyether sulfones via reaction of a dichlorodiphenyl sulfone component with a bisphenol component as monomers in the presence of alkali metal carbonate in the melt in the absence of solvents and diluents comprises carrying out the reaction in a mixing kneader which is operated with a shear rate in the range from 5 to 500 $s^{-1}$.

11 Claims, 1 Drawing Sheet

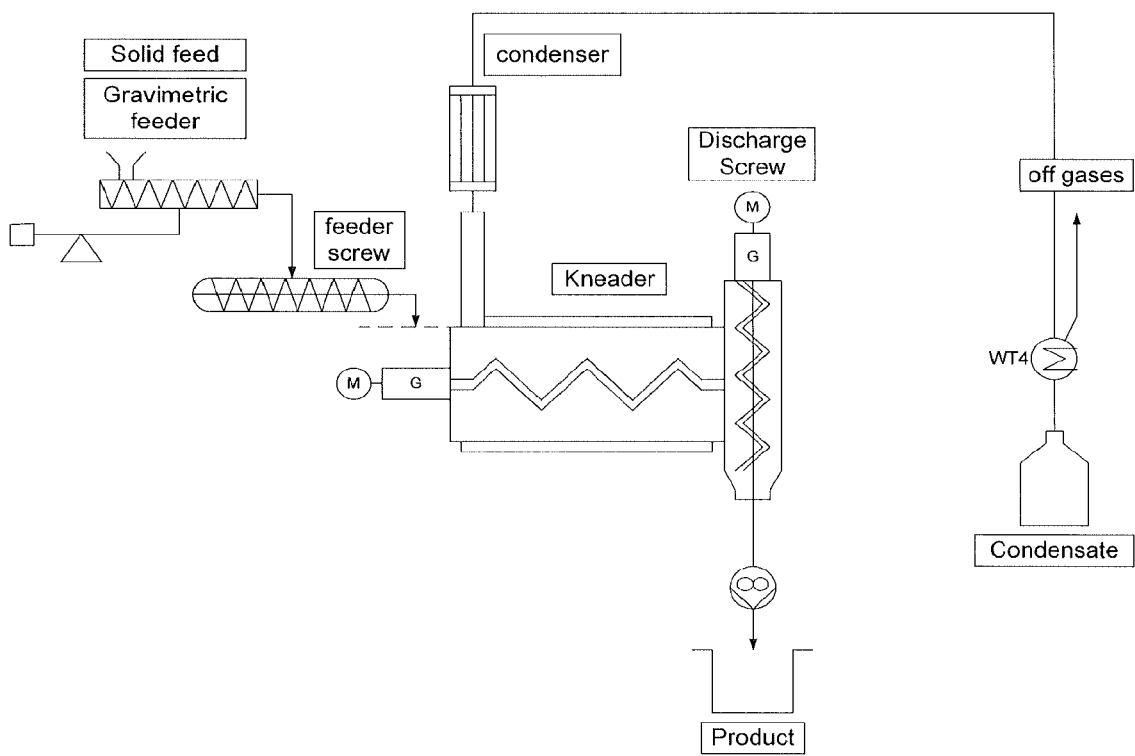

PROCESS FOR PRODUCING AROMATIC POLYETHER SULFONES

CROSS-REFERENCE TO RELATED APPLICATIONS

This application claims benefit (under 35 USC 119(e)) of U.S. Provisional Application 61/696,230, filed Sep. 3, 2012, which is incorporated by reference.

The invention relates to a process for producing aromatic polyether sulfones and to the polyether sulfones obtainable by the process.

Aromatic polyether sulfones are usually produced via condensation of a dichlorodiphenyl sulfone component with a bisphenol component as monomers in the presence of alkali metal carbonates. The polycondensation reaction usually takes place in a solvent, such as N-methylpyrrolidone (NMP). A disadvantage of a process of this type is that it requires handling of a toxic solvent which, after the reaction, has to be separated from the product and if necessary purified and returned to the reaction.

DE-A-27 49 645 relates to a process for producing polyethers by condensing amounts that are in essence equivalent of a bisphenol and of a dihalobenzene compound in the absence of solvents and diluents and in the presence of anhydrous alkali metal carbonate. Apparatuses mentioned are the kneaders or extruders that are conventionally used for polymers, where these have an apparatus for removing volatile constituents. The examples provide no further details of the apparatus used.

A SUMMARY OF THE INVENTION

It is an object of the present invention to provide a process for producing aromatic polyether sulfones via reaction of a dichlorodiphenyl sulfone component with a bisphenol component as monomers in the presence of alkali metal carbonate in the melt in the absence of solvents and diluents, where high molecular weights are to be obtainable and the aromatic polyether sulfones are to exhibit minimum discoloration.

The invention achieves the object via a process for producing aromatic polyether sulfones via reaction of a dichlorodiphenyl sulfone component with a bisphenol component as monomers in the presence of alkali metal carbonate in the melt in the absence of solvents and diluents, where the reaction is carried out in a mixing kneader which is operated with a shear rate in the range from 5 to 500 s$^{-1}$.

A BRIEF DESCRIPTION OF THE FIGURE

FIG. 1 depicts the apparatus schematically.

A DETAILED DESCRIPTION OF THE INVENTION

The fill level of the mixing kneader in the invention is in the range from preferably 0.2 to 0.8, more preferably from 0.22 to 0.7, in particular from 0.3 to 0.7, specifically from 0.35 to 0.64.

"Fill level" is the proportion that is filled by the starting monomers of the volume capacity in the kneader which can be filled with monomers and which permits mixing. A fill level in the range from 0.2 to 0.8 therefore means that from 20 to 80% of the volume capacity available for filling with monomers and mixing thereof are utilized for filling with monomers and alkali metal carbonate in the process.

The shear rate is defined as the velocity gradient in the kneading material in the gap between the rotating kneading element and the wall, $s = 2n*\pi*d_{rot}/(d_i - d_{rot})$, where the rotation rate is $n[s^{-1}]$, the rotor diameter is $d_{rot}$ [m], and the internal diameter of the apparatus is $d_i$ [m]. It describes the amount of shear produced by the mixing elements in the kneader, typically the shear between rotor and external wall, or between element and stator.

The shear rate is in the range from 5 to 500 s$^{-1}$, preferably from 10 to 250 s$^{-1}$, in particular from 20 to 100 s$^{-1}$.

If an s value of s/2 is used in the alternative, the shear rate is in the range from 5 to 500 s$^{-1}$, preferably from 25 to 100 s$^{-1}$, in particular from 35 to 70 s$^{-1}$.

Mixing kneaders used can comprise any of the known suitable mixing kneaders which permit heating above the melting point of the monomers and enable discharge of gaseous condensation products.

Suitable mixing kneaders generally have one, or preferably at least two, rotating shafts which are parallel to the axis, of which the main shaft can have areas with kneading elements arranged on their periphery. DE-A-41 18 884 and DE-A-199 40 521 describe suitable mixing kneaders by way of example.

The mixing kneader preferably has a rotor which is operated at a rotation rate in the range from 5 to 50 revolutions per minute, particularly preferably from 7.5 to 40 revolutions per minute, and in particular from 10 to 30 revolutions per minute.

An advantage of the mixing kneaders used in the invention is that the residence time can be substantially longer than in an extruder. Venting is moreover substantially easier and can be carried out to a greater extent, thus permitting easy discharge of the gaseous polycondensation products. The shear rate of the invention can moreover be established more easily in a mixing kneader.

The process of the invention can be carried out as batch process or as continuous process. The process is preferably carried out continuously, and it is preferable here to use continuously operated double-axis mixing kneaders as are obtainable by way of example in the form of LIST TCF or BUSS SMS.

The combination of mixing kneader, fill level, and shear rate in the invention permits achievement of high molecular weights for the aromatic polyether sulfones without disadvantageous discoloration of the product.

The process of the invention can produce a wide variety of different aromatic polyether sulfones by reacting one or more dichlorodiphenyl sulfone components with one or more bisphenol components as monomers.

The aromatic groups of the polyether sulfones, also termed arylene groups, can be identical or different, mutually independently being an aromatic moiety having from 6 to 18 carbon atoms.

Examples of suitable arylene groups are phenylene, bisphenylene, terphenylene, 1,5-naphthylene, 1,6-naphthylene, 1,5-anthrylene, 9,10-anthrylene, and 2,6-anthrylene. Among these, preference is given to 1,4-phenylene and 4,4'-biphenylene. It is preferable that these aromatic moieties are unsubstituted. However, they may bear one or more substituents. Examples of suitable substituents are alkyl, arylalkyl, aryl, nitro, cyano or alkoxy groups, and also heteroaromatics, such as pyridine, and halogen atoms. Among the preferred substituents are alkyl moieties having up to 10 carbon atoms, e.g. methyl, ethyl, isopropyl, n-hexyl, isohexyl, $C_1$-$C_{10}$-alkoxy moieties, such as methoxy, ethoxy, n-propoxy, and n-butoxy, aryl moieties having up to 20 carbon atoms, e.g. phenyl or naphthyl, and also fluorine and chlorine. Other preferred substituents are those obtained via reaction of the polyarylene ether sulfones with a reactive compound which comprises, alongside a C—C double or triple bond, one or more carbonyl, carboxylic acid, carboxylate, anhydride, amide, imide, carboxylic ester, amino, hydroxy, epoxy, oxazoline, urethane, urea, lactam, or halobenzyl groups. The bonding of the arylene groups to one another in the polyarylene ethers may be achieved not only by way of —$SO_2$— but also by way of example by way of —O—, —S—, —SO—, —CO—, —N=N—, —COO—, an alkylene moiety, which optionally can have substitution, or a chemical bond.

Polyarylene ether sulfones that can be used in the invention can be composed of repeating units of the formula I

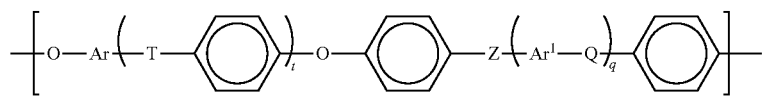

in which
t and q are mutually independently 0, 1, 2, or 3,
Q, T, and Z are mutually independently respectively a chemical bond or a group selected from —O—, —S—, —$SO_2$—, S=O, C=O, —N=N—, —$R^aC$=$CR^b$— and —$CR^cR^d$—,
where
$R^a$ and $R^b$ are mutually independently respectively a hydrogen atom or a $C_1$-$C_{12}$-alkyl group, and
$R^c$ and $R^d$ are mutually independently respectively a hydrogen atom or a $C_1$-$C_{12}$-alkyl, $C_1$-$C_{12}$-alkoxy, or $C_6$-$C_{18}$-aryl group,
where
$R^c$ and $R^d$ optionally mutually independently have substitution by fluorine and/or chlorine atoms or optionally form, together with the C atom bonded thereto, a $C_3$-$C_{12}$-cycloalkyl group which optionally has substitution by one or more $C_1$-$C_6$-alkyl groups, with the proviso that at least one of the groups T, Q, and Z is —$SO_2$—, and if t and q are 0 Z is —$SO_2$—,
Ar and $Ar^1$ are mutually independently $C_6$-$C_{18}$-arylene groups, where these can optionally have substitution by $C_1$-$C_{12}$-alkyl, $C_6$-$C_{18}$-aryl, or $C_1$-$C_{12}$-alkoxy groups, or by halogen atoms.

It is preferable that the aromatic polyether sulfones have at least one of the following structural units:

(I₁)

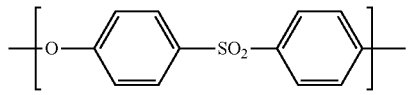

(I₂)

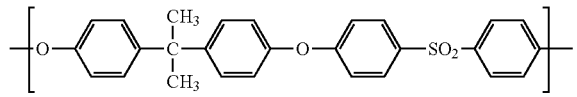

(I₃)

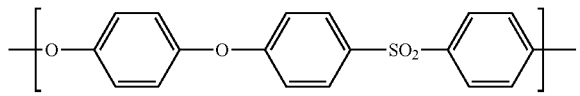

(I₄)

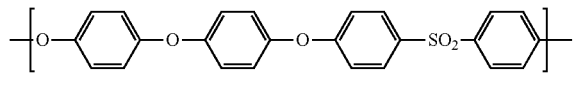

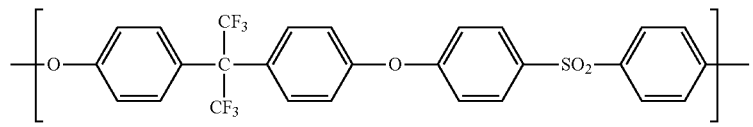
(I₅)

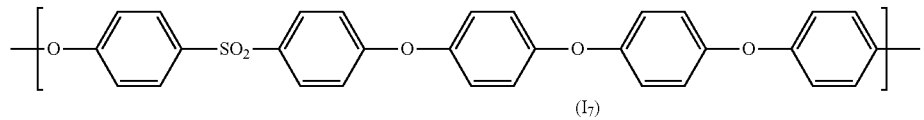
(I₆)

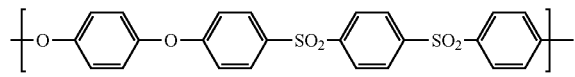
(I₇)

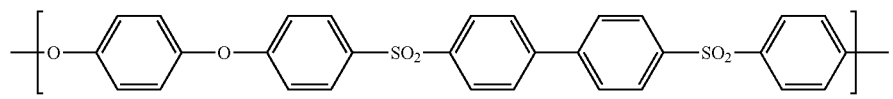
(I₈)

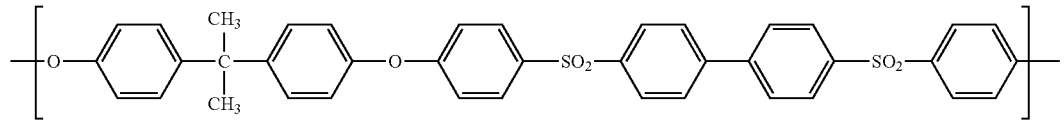
(I₉)

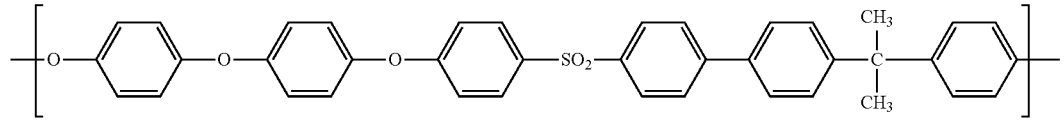
(I₁₀)

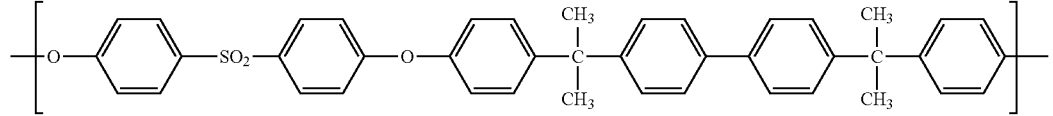
(I₁₁)

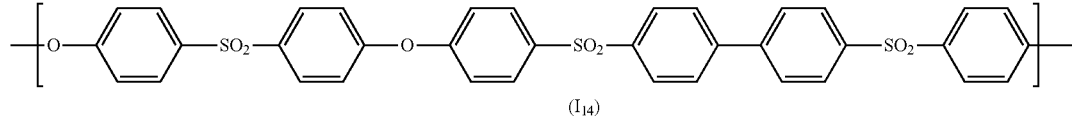
(I₁₂)

(I₁₃)

(I₁₄)

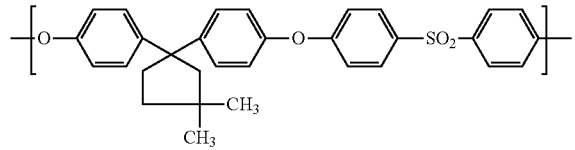

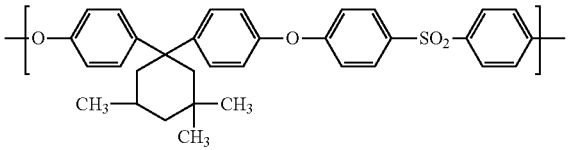
(I₁₅)

The dichlorodiphenyl sulfone components and bisphenol components used as monomers here derive from these structures. By way of example, dichlorodiphenyl sulfone and dihydroxydiphenyl sulfone are used for producing polyether sulfones. Products of this type are obtainable by way of example as Ultrason® E from BASF SE.

The reaction of dichlorodiphenyl sulfone and 4,4'-biphenol gives polyphenylene sulfone, which is obtainable as Ultrason® P from BASF SE.

Other suitable monomers are described by way of example in DE-A-27 49 645, WO 01/83618, and WO 2010/146052.

The reaction can use equimolar amounts of dichlorodiphenyl sulfone component and bisphenol component, or can use one of the components, typically the more volatile component, in excess.

If the mixing kneader is equipped with a reflux condenser for condensing vaporizing monomers, and if the condensed monomers are returned to the mixing kneader, it is possible to operate with equimolar amounts of the two monomer components, or with slight deviations therefrom.

The process of the invention can be carried out at any desired suitable temperatures, as long as the monomers are present in the melt. It is preferable to carry out the reaction at a temperature in the range from 250 to 350° C.

The reaction in the mixing kneader preferably takes place at atmospheric pressure, whereupon low-molecular-weight condensation products arising during the polycondensation are discharged in gaseous form.

The alkali metal carbonate, which is preferably potassium carbonate, can be introduced in the form of separate component into the mixing kneader in the reaction. However, it can also be used in the form of premix with at least one of the monomers. In the case of the condensation of bisphenols with dihalobenzene compounds, bisphenol and alkali metal carbonate can be reacted first, whereupon the product is then polycondensed in the mixing kneader with the dihalobenzene compound. Another possibility is incorporation by mixing into the dihalobenzene compound.

Various feed systems for the monomers and alkali metal carbonate can be used in a continuously operated mixing kneader. Liquid metering can be used where molten monomers are metered. It is preferable, as described, to predisperse the alkali metal carbonate in at least one of the monomer components, preferably in the halogen-containing monomer, because it is reactive toward the phenol groups and salts are formed.

It is also possible to achieve metering in solid form into the system, via gravimetric metering or via a lateral feed screw. In the case of introduction via the upper casing of the mixing kneader, it is necessary to ensure that solids do not cause any blockage. A minimum diameter of 150 mm for the upper casing is advantageous, as also is a short vertical falling distance for the solid powder before it reaches the kneading elements. It is moreover possible to granulate the monomers in such a way that their flow behavior is appropriate. If a lateral feed screw is used, the monomers and alkali metal carbonate have to be introduced in powder form into the lateral feed screw, and introduced through said screw into the mixing kneader.

The fill level in the mixing kneader can be controlled via the operation of a discharge screw which removes product in accordance with the introduction of material into the mixing kneader.

The reaction time in the mixing kneader can be selected freely, depending on the desired molecular weight of the aromatic polyether sulfone. It is preferable that the reaction time in the mixing kneader is from 1 to 3.5 hours, particularly from 1.5 to 3 hours.

If no reflux condenser is used, the amount of dichlorodiphenyl sulfone used should typically be increased by about 4 to 6 mol-% since the vapor pressure of this compound, about 100 mbar at a temperature of 300° C., causes it to vaporize more easily than the dihydroxydiphenyl sulfone component.

The invention also provides aromatic polyether sulfones obtainable by the process described above. The number-average molecular weight of aromatic polyether sulfones of this type is preferably above 10 000, and this number-average molecular weight is preferably in the range from 10 000 to 26 000. Polydispersity here is preferably from 2 to 7.5, particularly preferably from 2.4 to 3.2, for biphenol-based products, and particularly preferably from 3 to 7.5 for DHDPS-based products.

The examples below provide further explanation of the invention.

EXAMPLES

General Operating Specification

Polyether sulfone (PESU) is produced by a reaction of dichlorodiphenyl sulfone (DCDPS) with dihydroxydiphenyl sulfone (DHDPS) in the presence of potassium carbonate as base. Condensation byproducts arising are potassium chloride in the form of particulate salt, water, and carbon dioxide. Because the melting point of DHDPS is 247° C., the reaction is typically carried out at a temperature of about 300° C.

The reaction of dichlorodiphenyl sulfone (DCDPS) with 4,4'-biphenol (BPhOH) to give polyphenylene sulfone (PPSU) is carried out similarly. The reaction takes place in a LIST DTB mixing kneader, a single-shaft mixing kneader with self-cleaning system made of kneading elements and hook-shaped counterelements. The void volume of the mixing kneader in the laboratory experiment was about 770 ml.

The mixing kneader is heated with the aid of a thermostat, and only the external wall can be heated here. The three starting substances are introduced in the form of solid powder into the reactor. After flushing with argon, the reactor is heated to the reaction temperature, kept at this temperature for the required reaction time, and then cooled. The rotation rate of the motor of the mixing kneader is typically about 20 revolutions per minute during the reaction. On cooling, the temperature in the reactor falls below the glass transition temperature of the polymer, and the rotor has to be switched off. After cooling, the polymer was removed mechanically. The reactor is operated at ambient pressure.

During the reaction, the condensation products water and carbon dioxide are removed by distillation and discharged from the reactor with argon which flows at 10 l/h over the system. If no reflux condenser is used, some of the DCDPS monomer is concomitantly discharged, because its vapor pressure is high. In order to obtain high molecular weights, an excess of about 4 mol % of DCDPS has to be used if no reflux condenser is used.

In all of the experiments, the molar ratio of potassium carbonate to DHDPS is set to 1.06.

Example 1

Table 1 shows the experimental conditions and results for the production of polyether sulfone. The batch cycle time $t_c$ is given, alongside reaction temperature, rotor rotation rate, amounts of the monomers, and molar ratio.

After the reaction, the product was discharged mechanically from the mixing kneader, milled to a particle size of about 2 mm, and washed twice with water for three hours at 80° C. About 80% by weight of the potassium chloride formed as byproduct could thus be removed. The intrinsic viscosity IV determined is smaller than that of a pure polymer because of the remaining content of potassium chloride. The molecular weights were determined by GPC methods.

TABLE 1

| | \multicolumn{10}{c}{Experiment No.} | | | | | | | | | |
|---|---|---|---|---|---|---|---|---|---|---|
| | 1 | 2 | 3 | 4 | 5 | 6 | 7 | 8 | c50 | c51 |
| DCDPS (A) [g] | 129.29 | 129.29 | 129.29 | 129.29 | 129.29 | 126.69 | 127.41 | 128.12 | 129.29 | 129.29 |
| DHDPS (B) [g] | 108.32 | 108.32 | 108.32 | 108.32 | 108.32 | 109.32 | 108.87 | 108.42 | 108.32 | 108.32 |
| Molar ratio A/B | 1.04 | 1.04 | 1.04 | 1.04 | 1.04 | 1.01 | 1.02 | 1.03 | 1.04 | 1.04 |
| Rotation rate [rpm] | 20 | 20 | 20 | 20 | 20 | 20 | 20 | 20 | 0 | 200 |
| $T_r$ [° C.] | 300 | 290 | 280 | 300 | 300 | 300 | 300 | 300 | 300 | 300 |
| $t_c$ [hr] | 3 | 3 | 3 | 1.5 | 2.5 | 3 | 3 | 3 | 2.5 | 2.5 |
| IV [ml/g] | 83.9 | 79.6 | 36.6 | 55.1 | 60.8 | 80.8 | 60.5 | 48.2 | 10.1 | 16.1 |

TABLE 1-continued

| | Experiment No. | | | | | | | | | |
|---|---|---|---|---|---|---|---|---|---|---|
| | 1 | 2 | 3 | 4 | 5 | 6 | 7 | 8 | c50 | c51 |
| Mn [g/mol] | 26 400 | 25 400 | 18 000 | 17 800 | 22 300 | 20 450 | 17 900 | 15 900 | 5673 | 8390 |
| Mw [g/mol] | 95 600 | 100 000 | 44 100 | 48 600 | 87 200 | 78 760 | 46 600 | 42 500 | 13 560 | 19 736 |
| Mw/Mn | 3.6 | 3.9 | 2.5 | 2.7 | 3.9 | 3.9 | 2.6 | 2.7 | 2.4 | 2.3 |

The fill level of the mixing kneader in these examples was 0.22. The rotation rate of 20 revolutions per minute corresponds to a shear rate of 100 s$^{-1}$.

From the results in table 1 it is apparent that intrinsic viscosity rises with increasing temperature, and likewise with increasing residence time. The greater the deviation of the molar ratio from stoichiometry, the lower the intrinsic viscosity.

In the comparative experiments c50 and c51, the rotation rate of the mixer was varied, and a lower molecular weight was obtained here either by stopping the rotor or else by using a high rotation rate. In the absence of adequate rotation, there is a lack of formation of new interfaces between gas phase and melt, and it is therefore impossible to achieve adequate removal of the condensation products water and carbon dioxide. An excessive rotation rate raised the shear load on the melt by a factor of 10. The color of the product was substantially darker in comparison with example 5. Gel particles were also formed.

Example 2

In another experiment, the fill level of the mixing kneader was altered. The molar ratio of potassium carbonate was reduced in relation to DHDPS, and a somewhat reduced IV was therefore also observed. Table 2 below shows the results.

TABLE 2

| | Experiment No. | | | | |
|---|---|---|---|---|---|
| | 9 | 10 | 11 | c110 | c111 |
| DCDPS (A) [g] | 127.41 | 254.81 | 212.35 | 467.16 | 24.63 |
| DHDPS (B) [g] | 108.87 | 217.73 | 181.44 | 399.18 | 21.05 |
| K2CO3 (C) [g] | 63.73 | 127.45 | 106.21 | 233.66 | 12.32 |
| Molar ratio A/B | 1.02 | 1.02 | 1.02 | 1.02 | 1.02 |
| Molar ratio C/B | 1.06 | 1.06 | 1.06 | 1.06 | 1.06 |
| Fill level | 0.22 | 0.44 | 0.38 | 0.95 | 0.05 |
| Agitator velocity [1/min] | 20 | 20 | 20 | 20 | 20 |
| Tr [° C.] | 300 | 300 | 300 | 300 | 300 |
| tc [hr] | 3 | 3 | 3 | 3 | |
| IV [ml/g] | 104 | 77.5 | 111.5 | 5.1 | 10.2 |
| Mn [g/mol] | 19 000 | 25 220 | 22 890 | 2455 | 4837 |
| Mw [g/mol] | 104 000 | 92 200 | 166 900 | 4925 | 9980 |
| Mw/Mn | 5.5 | 3.7 | 7.3 | 2.0 | 2.0 |

The agitator velocity of 20 revolutions per minute again corresponds to a shear rate of 100 s$^{-1}$.

From the results it is apparent that markedly reduced molecular weights are obtained when fill levels are excessive or too low.

Example 3

Analogous experiments were carried out for the reaction of DCDPS with 4,4'-biphenol. Table 3 below collates the results.

TABLE 3

| | Experiment No. | | | | | | | |
|---|---|---|---|---|---|---|---|---|
| | 12 | 13 | 14 | 15 | 16 | 17 | 18 | 19 |
| DCDPS (A) [g] | 140.46 | 139.72 | 141.18 | 140.46 | 140.46 | 140.46 | 140.46 | 140.46 |
| Biphenol (B) [g] | 89.29 | 89.71 | 88.89 | 89.29 | 89.29 | 89.29 | 89.29 | 89.29 |
| K2CO3 [g] | 70.25 | 70.58 | 69.93 | 70.25 | 70.25 | 70.25 | 70.25 | 70.25 |
| Molar ratio A/B | 1.02 | 1.01 | 1.03 | 1.02 | 1.02 | 1.02 | 1.02 | 1.02 |
| Tr [° C.] | 300 | 300 | 300 | 300 | 300 | 310 | 290 | 300/310 |
| tc [hr] | 3 | 3 | 3 | 2 | 4 | 3 | 3 | 0.5/2.5 |
| IV [ml/g] | 55.6 | 61.1 | 44.1 | 56.1 | 36.6 | 60.3 | 35.9 | 62.2 |
| Mn [g/mol] | 16 400 | 26 000 | 15 800 | 19 300 | 11 000 | 22 200 | 12 300 | 21 600 |
| Mw [g/mol] | 50 300 | 63 600 | 39 000 | 51 200 | 29 500 | 62 600 | 30 800 | 63 000 |
| Mw/Mn | 3.1 | 2.5 | 2.5 | 2.7 | 2.7 | 2.8 | 2.5 | 2.9 |

The method and work-up were as in the experiments for table 1. Agitator velocity was 20 revolutions per minute, shear rate was 100 s$^{-1}$, and fill level was 0.22.

Intrinsic viscosity was also observed to fall as reaction time increased. Excessive residence time appears to lead to decomposition. The reaction time in the mixing kneader is therefore preferably at most three hours.

Example 4

In order to permit comparison between the use of a mixing kneader and of an extruder, a twin-screw kneader (LIST TCP) was used, with a void volume of 3.2 l and with a reflux system for the monomers. Potassium carbonate was used in an excess of 6 mol %. Agitator velocity was 20 revolutions per minute, fill level was 0.22, and shear rate was 30 s$^{-1}$. The comparative experiment used a laboratory extruder for the polycondensation reaction. Since the extruder does not permit reaction times of more than 30 minutes, the reaction time was defined uniformly as 30 minutes in this experiment. Table 4 below collates the results.

TABLE 4

|  | Experiment No. | |
| --- | --- | --- |
|  | 20 | c20 |
| DCDPS (A) [g] | 127.41 | 127.41 |
| DHDPS (B) [g] | 108.87 | 108.87 |
| Molar ratio A/B | 1.02 | 1.02 |
| Tr [° C.] | 300 | 300 |
| tc [hr] | 0.5 | 0.5 |
| IV [ml/g] | 15.1 | 5.6 |
| Mn [g/mol] | 7350 | 2500 |
| Mw [g/mol] | 14 800 | 5600 |
| Mw/Mn | 2.0 | 2.2 |

As is apparent from the results, the use of the mixing kneader leads to a substantially higher molecular weight. The resultant product also has markedly paler intrinsic color, whereas the product from the extruder had a brown color. It is therefore clear that the use of a mixing kneader in the invention is advantageous.

Example 5

The monomers DCDPS, DHDPS and $K_2CO_3$ are premixed in the amounts indicated in table 5 in the apparatus schematically depicted in FIG. 1. They are fed to the solid feed of the gravimetric feeder. By gravimetric feeding the starting materials are continuously transported to the feeder screw according to the desired flow capacity. From there they go to the kneader. The feeders screw is cooled, so that the starting materials are present in solid form. In the kneader the starting materials DCDPS and DHDPS are molten and start to react with a potash.

Thereupon, the polymer is formed and side products $H_2O$, $CO_2$ and KCl are formed. The gaseous components $H_2O$ and $CO_2$ are degased (separation of off-gases) and are removed from the reaction chamber via the off-gas piping. Part of the monomers DCDPS are supplemented in the gas phase and are condensed in the condenser and recirculated in the process.

The starting materials are mixed by the rotating kneader and polymerized while they are transported in axial direction through the kneader. At the exit of the kneader there is a discharge screw, which discharges the polymer melt still containing HCl from the kneader. Optionally, behind the discharge screw there can be a melt pump with which the amount discharged can be dosed. A granulation or underwater granulation can follow. The drive (in rpm) is equivalent to the following shear rates (in s$^{-1}$):

5 –7.4
15 –22.2
30 –44.2
50 –74

TABLE 5

| Reaction conditions | | | | | | | | Analytic untreated (average VZ) | | | | | |
| --- | --- | --- | --- | --- | --- | --- | --- | --- | --- | --- | --- | --- | --- |
| Temp. | Flow | | | | Molar amounts | | | Visc | Up | | | | VZ |
| I | capacity | drive | ADS | ZRP | DCDPS | DHDPS | K2CO3 | number | arrration. | GPC | | | corrected |
| [° C.] | [g/h] | [min$^{-1}$] | % | [min$^{-1}$] | [mol] | [mol] | [mol] | [ml/g] | relative | Mn | Mw | Mw/Mn | [ml/g] |
| 280 | 500 | 5 | 10 | — | 1.000 | 1.000 | 1.060 | 35.5 | 0.127 | 19600 | 49500 | 2.5 | 46.9 |
| 280 | 500 | 15 | 10 | — | 1.000 | 1.000 | 1.060 | 37.4 | 0.13 | 16710 | 45540 | 2.7 | 49.4 |
| 280 | 500 | 15 | 10 | — | 1.000 | 1.000 | 1.060 | 41.0 | 0.07 | | | | 54.2 |
| 280 | 500 | 15 | 10 | — | 1.000 | 1.000 | 1.060 | 39.2 | 0.07 | | | | 51.8 |
| 280 | 750 | 15 | 10 | | 1.000 | 1.000 | 1.060 | 27.4 | 0.137 | | | | 36.2 |
| 280 | 750 | 15 | 10 | — | 1.000 | 1.000 | 1.060 | 25.6 | 0.11 | | | | 33.8 |
| 280 | 750 | 15 | 10 | — | 1.000 | 1.000 | 1.060 | 25.8 | 0.2 | | | | 34.1 |
| 285 | 600 | 15 | 10 | — | 1.000 | 1.000 | 1.060 | 34.1 | 0.078 | | | | 45.0 |
| 290 | 500 | 5 | 10 | — | 1.000 | 1.000 | 1.060 | 26.5 | 0.05 | | | | 35.0 |
| 290 | 500 | 5 | 10 | — | 1.000 | 1.000 | 1.060 | 29.4 | 0.05 | | | | 38.8 |
| 290 | 500 | 15 | 10 | — | 1.000 | 1.000 | 1.060 | 44.2 | 0.16 | | | | 58.4 |
| 290 | 500 | 30 | 10 | — | 1.000 | 1.000 | 1.060 | 35.1 | 0.06 | 14500 | 32100 | 2.2 | 46.4 |
| 290 | 500 | 50 | 10 | — | 1.000 | 1.000 | 1.060 | 34.0 | 0.26 | | | | 44.9 |
| 290 | 750 | 15 | 10 | — | 1.000 | 1.000 | 1.060 | 41.7 | 0.12 | | | | 55.1 |
| 290 | 750 | 15 | 7.5 | — | 1.000 | 1.000 | 1.060 | 38.1 | 0.085 | 17400 | 41000 | 2.4 | 50.3 |
| 290 | 750 | 15 | 5 | — | 1.000 | 1.000 | 1.060 | 42.3 | 0.11 | 15200 | 35700 | 2.3 | 55.9 |
| 290 | 750 | 50 | 10 | | 1.000 | 1.000 | 1.060 | 38.2 | 0.189 | | | | 50.5 |
| 290 | 1000 | 15 | 10 | — | 1.000 | 1.000 | 1.060 | 28.4 | 0.22 | | | | 37.5 |
| 300 | 500 | 15 | 10 | — | 1.000 | 1.000 | 1.060 | 28.8 | 0.099 | 10700 | 23000 | 2.1 | 38.0 |
| 300 | 500 | 30 | 10 | — | 1.000 | 1.000 | 1.060 | 34.7 | 0.284 | 13200 | 30000 | 2.3 | 45.8 |
| 300 | 1000 | 30 | 10 | — | 1.000 | 1.000 | 1.060 | 32.1 | 0.137 | 13300 | 30500 | 2.3 | 42.4 |
| 280 | 500 | 15 | 10 | — | 1.010 | 1.000 | 1.060 | 32.3 | 0.06 | | | | 42.7 |
| 290 | 500 | 15 | 10 | — | 1.010 | 1.000 | 1.060 | 43.2 | 0.1 | | | | 57.1 |
| 290 | 500 | 30 | 10 | — | 1.010 | 1.000 | 1.060 | 36.5 | 0.08 | | | | 48.2 |

TABLE 5-continued

| Reaction conditions | | | | | Molar amounts | | | Analytic untreated (average VZ) | | | | | VZ |
| --- | --- | --- | --- | --- | --- | --- | --- | --- | --- | --- | --- | --- | --- |
| Temp. | Flow | | | | | | | Visc | Up | | GPC | | |
| I | capacity | drive | ADS | ZRP | DCDPS | DHDPS | K2CO3 | number | arrration. | | | | corrected |
| [° C.] | [g/h] | [min⁻¹] | % | [min⁻¹] | [mol] | [mol] | [mol] | [ml/g] | relative | Mn | Mw | Mw/Mn | [ml/g] |
| 280 | 500 | 15 | 10 | — | 1.020 | 1.000 | 1.060 | 24.3 | 0.13 | | | | 32.1 |
| 290 | 500 | 5 | 10 | — | 1.020 | 1.000 | 1.060 | 42.1 | 0.1 | | | | 55.7 |
| 290 | 500 | 15 | 10 | — | 1.020 | 1.000 | 1.060 | 37.6 | 0.15 | | | | 49.7 |
| 290 | 500 | 15 | 10 | — | 1.020 | 1.000 | 1.060 | 32.6 | 0.09 | | | | 43.1 |
| 290 | 500 | 15 | 10 | — | 1.020 | 1.000 | 1.100 | 39.5 | 0.29 | | | | 52.2 |
| 290 | 500 | 30 | 10 | — | 1.020 | 1.000 | 1.060 | 34.8 | 0.04 | | | | 46.0 |
| 290 | 750 | 15 | 10 | — | 1.020 | 1.000 | 1.060 | 38.1 | 0.16 | | | | 50.4 |
| 290 | 750 | 15 | 10 | — | 1.020 | 1.000 | 1.100 | 39.5 | 0.22 | 12200 | 27600 | 2.3 | 52.2 |
| 290 | 900 | 15 | 10 | — | 1.020 | 1.000 | 1.060 | 24.7 | 0.34 | | | | 32.6 |
| 280 | 500 | 15 | 3 | — | 1.030 | 1.000 | 1.060 | 22.7 | 0.14 | 10800 | 28200 | 2.6 | 30.0 |
| 290 | 500 | 15 | 3 | — | 1.030 | 1.000 | 1.060 | 40.4 | 0.06 | 20200 | 43800 | 2.2 | 53.4 |
| 290 | 500 | 15 | 1.5 | — | 1.030 | 1.000 | 1.060 | 50.1 | 0.09 | 25000 | 56500 | 2.3 | 66.2 |

The invention claimed is:

1. A process for producing aromatic polyether sulfones via reaction of a dichlorodiphenyl sulfone component with a bisphenol component as monomers in the presence of alkali metal carbonate in the melt in the absence of solvents and diluents, which comprises carrying out the reaction in a mixing kneader which is operated with a shear rate in the range from 5 to 500 s⁻¹, wherein the process is carried out continuously and the reaction in the mixing kneader takes place at atmospheric pressure.

2. The process according to claim 1, wherein the fill level of the mixing kneader is in the range from 0.2 to 0.8.

3. The process according to claim 1, wherein the shear rate of the mixing kneader is in the range from 10 to 250 s⁻¹.

4. The process according to claim 1, wherein the mixing kneader has a rotor which is operated at a rotation rate in the range from 5 to 50 revolutions per minute.

5. The process according to claim 1, wherein the alkali metal carbonate is anhydrous.

6. The process according to claim 1, wherein the mixing kneader has a reflux condenser for condensing vaporizing monomers and the condensed monomers are returned to the mixing kneader.

7. The process according to claim 1, which is carried out at a temperature in the range from 250 to 350° C.

8. The process according to claim 1, wherein the alkali metal carbonate is used in the form of a premixture with at least one of the monomers.

9. The process according to claim 1, wherein the aromatic polyether sulfones have at least one of the following structural units:

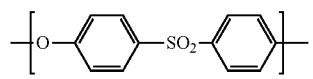
(I₁)

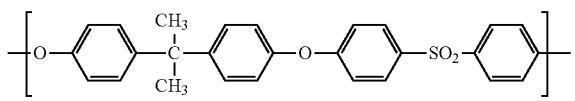
(I₂)

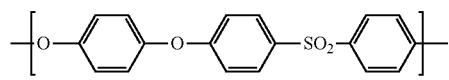
(I₃)

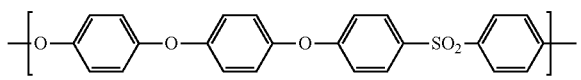
(I₄)

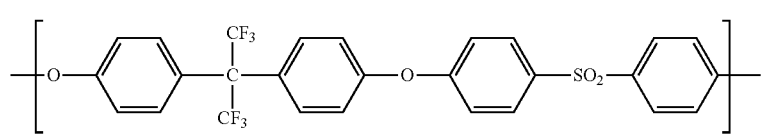
(I₅)

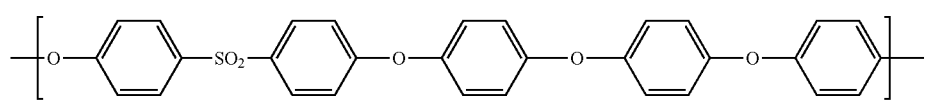
(I₆)

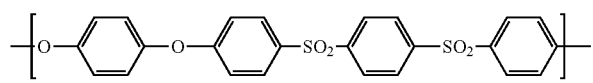
(I₇)

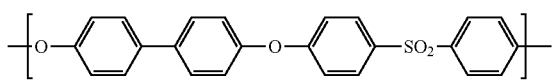
(I₈)

-continued
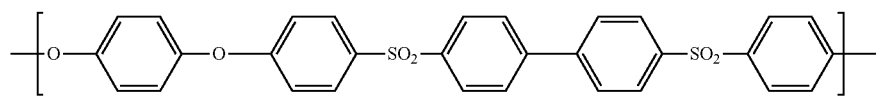
(I₉)
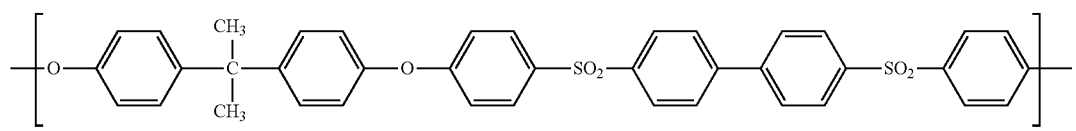
(I₁₀)
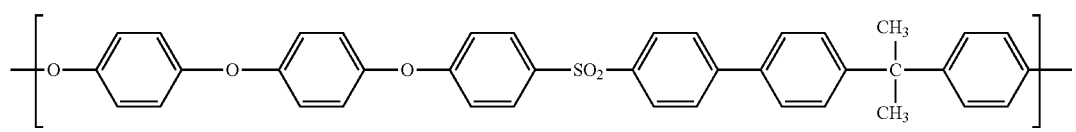
(I₁₁)
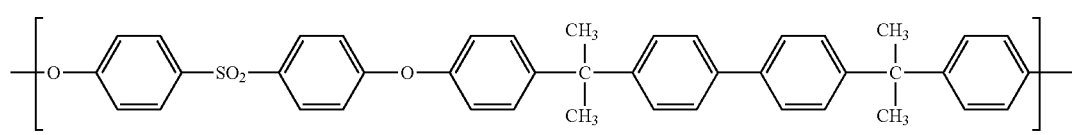
(I₁₂)
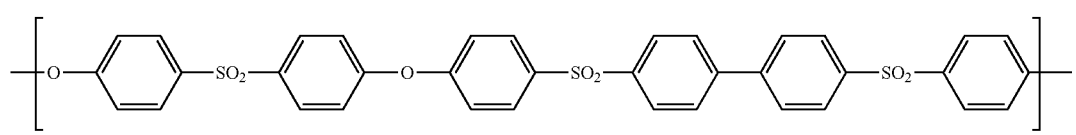
(I₁₃)
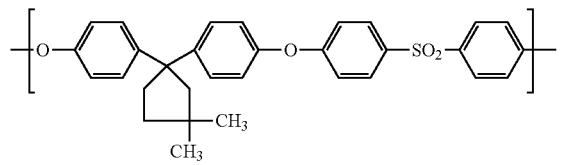
(I₁₄)
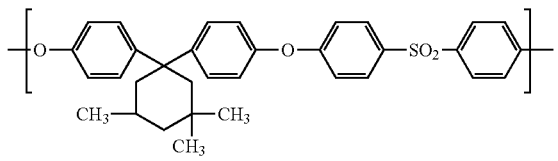
(I₁₅)
10. An aromatic polyether sulfone obtainable by the process according to claim 1.
11. The process according to claim 1, wherein the fill level of the mixing kneader is in the range from 0.22 to 0.7.
* * * * *